United States Patent [19]
Koch et al.

[11] 3,790,136
[45] Feb. 5, 1974

[54] DIE CASTING MACHINE
[75] Inventors: Friedrich Koch; Hubert Zeug, both of Achim, Germany
[73] Assignee: Desma-Werke GmbH, Achim, Germany
[22] Filed: Jan. 26, 1972
[21] Appl. No.: 220,771

[30] Foreign Application Priority Data
　　Jan. 29, 1971　Germany............... P 21 04 087.9

[52] U.S. Cl............................... 259/192, 259/104
[51] Int. Cl............................................ B01f 7/08
[58] Field of Search....... 259/191, 192, 193, 5, 6, 9, 259/10, 104, 21, 22; 100/144, 145

[56]　　　　　References Cited
　　　　　UNITED STATES PATENTS
3,669,416　6/1972　Sutter...................................... 259/5
3,583,679　6/1971　Godley.................................... 259/5
3,349,725　10/1967　Bini...................................... 259/192

Primary Examiner—Robert W. Jenkins
Attorney, Agent, or Firm—Richards & Geier; V. Alexander Scher

[57]　　　　　ABSTRACT

A die casting machine is intended for sprayable materials, particularly artificial materials. The material is plastified in separate devices, particularly in an extruder and is supplied therefrom to a spraying aggregate which sprays the plastified material through an injection piston into the hollow space of a die cast mould. The invention is particularly characterized in that the injection piston is a rotary worm piston.

2 Claims, 3 Drawing Figures

DIE CASTING MACHINE

This invention relates to a die casting machine for sprayable materials, particularly artificial materials, where the material is plastified in separate devices, particularly in an extruder and from there is supplied to a spraying aggregate which sprays the plastified material through an injection piston into the hollow space of a die cast mould.

Die casting machines of this type wherein an extruder is provided for plastifying the material which is separate from the spraying aggregate, so that separate aggregates are provided for plastifying and spraying the material, are used primarily in cases wherein the volume as well as the shape of the spray require the spraying of comparatively large amounts of material in a spraying time period which is within short time measures. The spraying aggregate as well as the injection piston are then adapted for treating large amounts of material per spray time measure.

The described die casting machines are preferably used for treating foaming artificial materials to make sprayed parts of large volume. By way of example, these sprayed parts can consist of complete pieces of furniture and the like.

In known die casting machines of this type the injection piston of the spraying aggregate is constructed as a reciprocating cylindrical piston. In actual practice the remaining of residues of the plastified material upon the front side of the cylindrical injection piston cannot be avoided. This condition is caused by the fact that a full spraying of the plastified material from the spraying aggregate into the die cast mould is not possible, but that a substantial residue of the material remains in the spraying aggregate after each spraying operation. This material is collected in a section directed toward the injection piston. A particular drawback of this is that the residue of the material collected at the beginning of an operational period remains there and is not continuously renewed or replaced after each following spraying during the further operation of the machine. Thus a part of the material remains continuously in the spraying aggregate, which had stayed there from the initial spraying operations; it remains until the machine has been cleaned in a comparatively complicated manner. This remaining material residue in the spraying aggregate is undesirable, particularly since during the operation of the machine this material is subjected to chemical and physical changes which can have a detrimental effect upon the quality of the spraying. In addition difficulties occur in case the material being sprayed or its color are changed, since the residues are mixed with the new material.

An object of the present invention is to further develop and improve a die casting machine of the described type so as to avoid residues in the spraying aggregate without the use of expensive constructions.

Other objects of the present invention will become apparent in the course of the following specification.

In the realization of the objectives of the present invention it was found desirable to construct the injection piston of the spraying aggregate as a rotary worm piston.

This worm piston has the advantage that the residues of the sprayed material, particularly the remaining residues, are avoided in the spraying aggregate, since plastified materials supplied from the extruder are continuously transmitted in the spraying direction in the spraying aggregate. Material residues which may remain during a spraying operation in the spraying aggregate are removed without fail from the spraying aggregate during the next spraying operation.

Worm pistons are known as such. However, up to now they were used only in worm die casting machines. There the worm piston has primarily the purpose of plastifying the spray material by worm transport.

On the other hand in the die casting machine of the present invention the worm piston has the new task of the exclusive transportation of the material since plastification takes place in the preconnected extruder.

According to a further feature of the present invention two or more extruders can be combined with one spraying aggregate. The present invention provides a special connection of these extruders with the spraying aggregate which will be described in detail hereinafter.

The die casting machine of the present invention is particularly advantageously suitable for carrying out a process of producing and treating a sprayable foamable material wherein the driving gas is introduced into the already plastified material within the range of the supply zone of the spraying aggregate wherein there is a comparatively low pressure. In accordance with the present invention the extruder is connected within one zone with the spraying aggregate under comparatively high pressure. Then there is a supply zone located in the direction of movement of the material having a comparatively lower pressure, into which the driving gas is introduced. Then follows a mixing zone with increasing pressure in which the driving gas and the material are thoroughly mixed with each other.

The invention will appear more clearly from the following detailed description when taken in connection with the accompanying drawings showing by way of example only, a preferred embodiment of the inventive idea.

Figure 1:
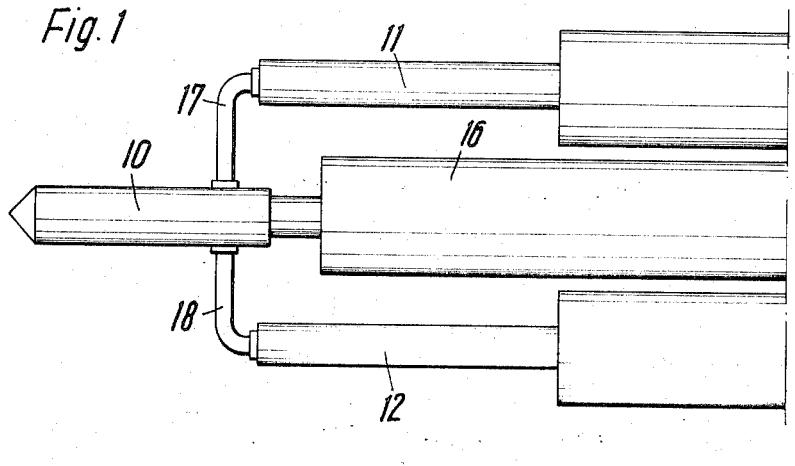
FIG. 1 is a diagrammatic plan view of a die casting machine of the present invention.
Figure 2:
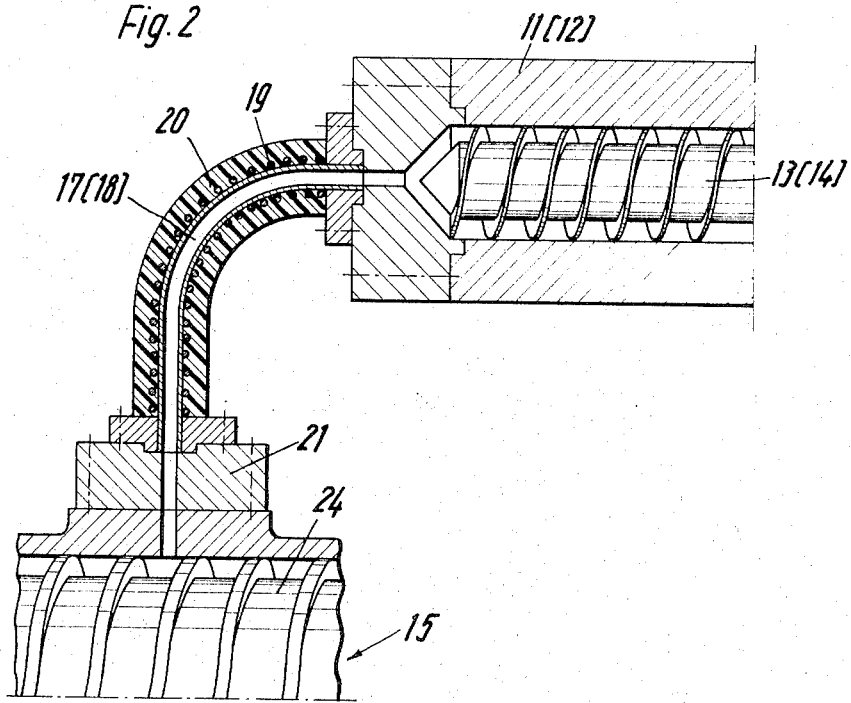
FIG. 2 is a horizontal section on an enlarged scale of a part of the machine showing the connection of the extruder with a spraying aggregate.

The die casting machine shown in FIG. 1 of the drawings includes a spraying aggregate 10 connected with two extruders 11 and 12. The extruders 11 and 12 have the task to plastify the material being sprayed, for example, an artificial material, and to supply it to the spraying aggregate 10. The spraying aggregate 10 has then the task of spraying the plastified material into a die cast mould (not shown). For this purpose the extruders 11 and 12 are provided with plastifying worm 13 and 14 (FIG. 2). The spraying aggregate is provided with an injection piston constructed as a rotary worm piston 15. A short spraying of a larger amount of the material takes place by a correspondingly quick axial movement of the worm piston 15. A suitable driving aggregate 16 is used to move the worm piston 15 in the axial direction and also to rotate it.

The extruders 11 and 12 are connected with the spraying aggregate 10 by separate supply conduits 17 and 18. The outer surfaces of these conduits 17 and 18 are enclosed by heating means, namely, a heating spiral 19. The heating spiral 19 is embedded in a cover 20, preferably of aluminum.

The supply conduits 17 and 18 are provided with a throttle nipple 21 which may be made replaceable; in the illustrated embodiment it is located upon the end directed toward the spraying aggregate. The nipple 21 makes possible the regulation of the amount of the material supplied from the extruders 11 or 12, so that by the use of the nipple 21 it is possible to measure the entire amount of the material supplied to the spraying aggregate.

Figure 3:
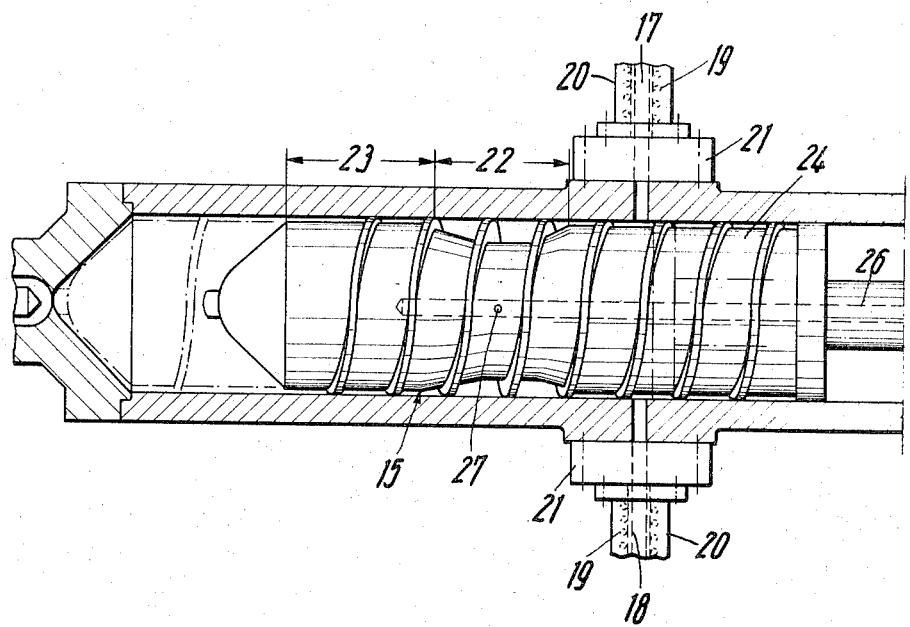
FIG. 3 is a longitudinal section through a portion of a spraying aggregate, also on an enlarged scale.

As best shown in FIG. 3, the plastified material is supplied from the extruders 11 and 12 into the spraying aggregate 10 within the range of the stroke of the worm piston 15. By making the injection piston as a rotary worm piston 15 the supplied material can be used up without any residue, namely, it can be sprayed in fully. Any eventual residues of the material are continuously transported in the direction toward the spraying nozzle and are thus pushed out by the worm piston during the next spraying operation.

The present invention is particularly advantageous for a die casting machine wherein the material is plastified in the extruders 11 and 12 without the use of driving gas and is then introduced into the spraying aggregate 10. The driving gas is introduced into the sprayed material within the spraying aggregate 10, namely, in the supply zone 22 which is subjected to lesser pressure than those existing in other sections. A mixing zone 23 of higher pressure is located further in the transportation direction of the material; the driving gas and the sprayed material are thoroughly mixed therein.

In the illustrated embodiment the zones having different pressures are produced by providing the worm piston with a helical core 24 which has a smaller diameter in the range of the supplying zone 22 than outside of this zone 22. Since the sprayed material is already introduced in a plastified state, it does not need a plastifying zone or lower or rising pressure. However, at the entry section of the material the helical core 24 has substantially the same dimensions as within the mixing zone 23.

The supply of the driving gas takes place advantageously through an axial bore 26 in the helical core 24. This axial bore 26 opens with radial bore holes 27 into the supply zone 22.

In the illustrated embodiment a bore hole 27 has been shown in a simplified manner. In actual practice it was found advisable and even necessary to insert in these bore holes special nozzle pins with knurled edges.

We claim:

1. A die casting machine for sprayable materials, comprising two spaced extruders, a separate plastifying worm in each extruder, a spraying aggregate, a separate supply conduit connected with each extruder and having a throttle nipple connected to said spraying aggregate, said nipples being located on opposite sides of said spraying aggregate, a separate heating spiral enclosing each supply conduit, a rotary worm piston in said spraying aggregate, and means reciprocating said worm piston in said spraying aggregate.

2. A die casting machine according to claim 1, wherein said spraying aggregate comprises an inner opening communicating said reciprocating means an outer spraying opening, a supply zone located adjacent said nipples and a mixing zone located between said supply zone and said outer opening, said worm piston having a helical core of lesser diameter in said supply zone than on both sides outside of said supply zone, an axial bore extending through the portion located in said supply zone and communicating with said reciprocating means and a radial bore hole connected with said axial bore and opening into said supply zone.

* * * * *